UNITED STATES PATENT OFFICE.

VICTOR EINAIGL, OF BALTIMORE, MARYLAND, ASSIGNOR TO THE HOOPES ARTIFICIAL STONE, CEMENT, AND PAINT COMPANY, OF SAME PLACE.

MANUFACTURE OF ARTIFICIAL STONE.

SPECIFICATION forming part of Letters Patent No. 256,103, dated April 4, 1882.

Application filed August 16, 1881. Renewed March 14, 1882. (No specimens.)

*To all whom it may concern:*

Be it known that I, VICTOR EINAIGL, of Baltimore, in the county of Baltimore, and in the State of Maryland, have invented certain new and useful Improvements in the Manufacture of Artificial Stone; and I do hereby declare that the following is a full, clear, and exact description thereof.

The design of my invention is mainly the production of an artificial stone which shall possess great density, strength, and durability; and to this end it consists in an artificial stone composed of carbonate of soda, carbonate of potash, calcined quartz-sand, oxide of calcium, oxide of magnesium, clay, and silicious sand, combined in the manner and proportions substantially as and for the purpose hereinafter specified.

In the production of artificial stone I take of carbonate of soda, fifteen parts, by weight; carbonate of potash, forty parts; and quartz-sand, 93.55 parts, and melt the same together, after which the mass is dissolved in distilled water and the solution evaporated to the consistency of sirup at a temperate of about 80° Celsius. Of the mixture thus compounded I take, by weight, five hundred parts and add to the same oxide of calcium, two hundred parts; oxide of magnesium, fifty parts; potter's clay, one hundred and fifty parts; water, one thousand parts, and about one thousand parts of silicious sand, and thoroughly mix the same into a mass having such consistency as to enable it to be easily molded, the consistency being regulated by the proportion of the silicious sand incorporated with the mass.

The compound described undergoes a hardening process when exposed to the air, such effect being produced by the formation of insoluble silicates of calcium, magnesium, and aluminium, which are proof against atmospheric influences, water, and fire.

For use as a paint I add to four hundred parts of the mixture first described a previously-prepared mixture composed of two hundred parts calcined quartz-sand, two hundred parts oxide of calcium, fifty parts oxide of magnesium, and one hundred parts soft potter's clay, the resultant product being a pigment which hardens quickly, and, like the stone before described, is proof against atmospheric influences, water, and fire.

To color the pigment any one of the various metallic oxides may be added, the proportion being governed by the effect produced.

An excellent hydraulic cement is produced by adding to one hundred and twenty parts of the mixture first described three hundred parts carbonate of lime, two hundred parts oxide of calcium, of which one hundred and fifty parts are previously slaked, and three hundred and eighty parts brick-dust, from which, without calcination, I obtain a cement which readily hardens under water and possesses a density equal to glass.

Having thus fully set forth the nature and merits of my invention, what I claim as new is—

An artificial stone composed of carbonate of soda, carbonate of potash, calcined quartz-sand, oxide of calcium, oxide of magnesium, clay, and silicious sand, combined in the manner and proportions substantially as and for the purpose specified.

In testimony that I claim the foregoing I have hereunto set my hand this 16th day of August, 1881.

VICTOR EINAIGL.

Witnesses:
F. H. SMITH,
J. T. COLDWELL.